(12) United States Patent
Braun et al.

(10) Patent No.: US 7,149,864 B2
(45) Date of Patent: Dec. 12, 2006

(54) METHOD AND CIRCUIT FOR ALLOCATING MEMORY ARRANGEMENT ADDRESSES

(75) Inventors: Georg Braun, Holzkirchen (DE); Andreas Jakobs, München (DE)

(73) Assignee: Infineon Technologies AG, Munich (DE)

( * ) Notice: Subject to any disclaimer, the term of this patent is extended or adjusted under 35 U.S.C. 154(b) by 342 days.

(21) Appl. No.: 10/777,992

(22) Filed: Feb. 12, 2004

(65) Prior Publication Data
US 2004/0225856 A1 Nov. 11, 2004

(30) Foreign Application Priority Data
Feb. 14, 2003 (DE) ................. 103 06 149

(51) Int. Cl.
*G06F 12/02* (2006.01)
(52) U.S. Cl. .................................... 711/170
(58) Field of Classification Search ............... 365/63; 341/58; 709/222; 711/170
See application file for complete search history.

(56) References Cited

U.S. PATENT DOCUMENTS

| | | | |
|---|---|---|---|
| 5,517,617 A * | 5/1996 | Sathaye et al. ............. | 709/222 |
| 5,860,080 A * | 1/1999 | James et al. ................ | 711/4 |
| 6,345,348 B1 * | 2/2002 | Watanabe et al. ........... | 711/170 |
| 6,434,035 B1 * | 8/2002 | Miersch et al. ............. | 365/63 |
| 6,734,811 B1 * | 5/2004 | Cornelius .................... | 341/58 |
| 6,931,505 B1 * | 8/2005 | David .......................... | 711/167 |
| 2002/0129215 A1 * | 9/2002 | Yoo et al. .................... | 711/167 |
| 2002/0161968 A1 * | 10/2002 | Yoo et al. .................... | 711/105 |
| 2003/0016550 A1 * | 1/2003 | Yoo et al. .................... | 365/63 |

FOREIGN PATENT DOCUMENTS

| | | |
|---|---|---|
| DE | 693 08 942 | 1/1994 |
| DE | 197 04 044 | 3/2000 |

OTHER PUBLICATIONS

German Search Report dated Dec. 4, 2003.

* cited by examiner

*Primary Examiner*—Pierre Bataille
*Assistant Examiner*—Paul Schlie
(74) *Attorney, Agent, or Firm*—Patterson & Sheridan, L.L.P.

(57) ABSTRACT

Methods and apparatus for allocating memory arrangement addresses to a buffer chip, during an initialization mode, for use in addressing one or more memory arrangements connected to the buffer chip are provided. A buffer circuit may receive first initialization data specifying a first set of available memory arrangement addresses and associate one or more of the first set of available memory arrangement addresses with the one or more memory arrangements connected to the buffer chip. The buffer circuit may also generate second initialization data specifying the set of available memory arrangement addresses available after the association. The second initialization data may be transmitted to another buffer circuit for use in address allocation or back to a memory access control unit.

20 Claims, 3 Drawing Sheets

| | | COMMAND | | | |
|---|---|---|---|---|---|
| | | 0 | 1 | 2 | 3 |
| COMMAND BITS | CA[0] | R[0] | HUB | A[0] | A[8] |
| | CA[1] | R[1] | RAS | A[1] | A[9] |
| | CA[2] | R[2] | CAS | A[2] | A[10] |
| | CA[3] | R[3] | WE | A[3] | A[11] |
| | CA[4] | R[4] | B[0] | A[4] | A[12] |
| | CA[5] | R[5] | B[1] | A[5] | A[13] |
| | CA[6] | R[6] | B[2] | A[6] | A[14] |
| | CA[7] | R[7] | B[3] | A[7] | A[15] |

FIG. 2

METHOD AND CIRCUIT FOR ALLOCATING MEMORY ARRANGEMENT ADDRESSES

CROSS-REFERENCE TO RELATED APPLICATIONS

This application claims foreign priority benefits under 35 U.S.C. §119 to co-pending German patent application number 103 06 149.5, filed Feb. 14, 2003. This related patent application is herein incorporated by reference in its entirety.

BACKGROUND OF THE INVENTION

1. Field of the Invention

The invention relates to a method for allocating memory arrangement addresses to a buffer chip for one or more memory arrangements connected to the control chip. The invention also relates to a buffer chip which can be used to allocate memory arrangement addresses to memory arrangements.

2. Description of the Related Art

For very fast and high-density memory architectures, such as DDR-III (double data rate), "buffer chips" will be required in future. These buffer chips allow the "STUB bus", as used today in DDR and DDR-II systems, to be replaced and instead point-to-point connections (P2P) or point-to-two-point connections (P22P) to be used. Such connections have the advantage that data transfer rates far beyond 1 Gbps are possible. By cascading the buffer chips, it also becomes possible to concatenate a large number of buffer chips with one another (daisy chain) and to produce memory systems having a very large number of memory arrangements on just one memory bus.

Normally, a buffer chip forms a memory module together with one or more memory arrangements, which are used in a computer system, for example. The memory modules can be in the form of DIMM modules, for example. Since the memory modules initially have no permanent address allocation, it is first of all necessary to allocate memory arrangement addresses to the respective memory modules when the computer system is started or after a reset. Since such memory modules with buffer chips are not connected to one another by means of a common bus, however, it is not possible to allocate the memory arrangement addresses using conventional methods. Instead, the memory modules are arranged in series, with each of the memory modules having an input and an output, and the output of one buffer chip being connected to the input of a subsequent buffer chip.

SUMMARY OF THE INVENTION

It is an object of the present invention to provide a method for allocating memory arrangement addresses which can be used with the aforementioned buffer chips and their interconnection. It is also an object of the present invention to provide a method for allocating memory arrangement addresses in a bus system having a plurality of buffer chips. It is also an object of the present invention to provide a buffer chip which can be used to provide respective memory modules with memory arrangement addresses.

A first aspect of the present invention provides a method for allocating memory arrangement addresses to a buffer chip for one or more memory arrangements which are connected to the buffer chip. In normal mode, the memory arrangement addresses can be used to address the connected memory arrangements. The memory arrangement addresses for the memory arrangements are allocated in an initialization mode. In this case, the first initialization data are first received, with the first initialization data specifying available memory arrangement addresses. Next, memory arrangement addresses are associated with the one or more memory arrangements connected to the buffer chip. The associated memory arrangement addresses are in this case chosen from the available addresses. Next, second initialization data are generated, with the memory arrangement addresses which are available according to the first initialization data being reduced in the second initialization data by the memory arrangement addresses which are associated with the memory arrangements connected with the buffer chip. The second initialization data are then transmitted and are thus made available either to a subsequent buffer chip connected with a subsequent memory module or to a memory access control unit.

The inventive method has the advantage that the buffer chip recognizes its associated memory arrangements and allocates them individual memory arrangement addresses which do not conflict with memory arrangement addresses which have already been assigned. This is made possible by virtue of the buffer chip receiving available memory arrangement addresses as first initialization data and selecting therefrom a number of memory arrangement addresses which the buffer chip assigns to the memory arrangements which are connected to it.

The second initialization data are then generated in order to make them available to a further buffer chip or to a memory access control unit (memory controller), so that, by way of example, a downstream buffer chip receives the information regarding which of the memory arrangements are still available after the memory arrangement addresses have been assigned and which are in use. The second initialization data therefore contain information about which memory arrangement addresses are still available after the buffer chip has assigned memory arrangement addresses for the memory arrangements which are connected to it.

Preferably, the first initialization data comprise a number of bits, with each bit corresponding to an address for a memory arrangement. That is to say that, when a bit has been set, one of the memory arrangements which is able to be addressed using this bit is addressed.

Preferably, the initialization mode is assumed after the buffer chip has been reset or after the buffer chip has been turned on. The initialization mode is terminated when allocation of the memory arrangement addresses has concluded. This automatically starts the method for allocating the memory arrangement addresses as soon as the buffer chip and the memory arrangements connected thereto are turned on or reset.

Provision can likewise be made for the initialization mode to be assumed as a result of command data being received. This is a second way of starting the initialization mode. Preferably, turning-on or resetting of the buffer chips is followed by an arbitrary memory arrangement address being allocated to the buffer chip, so that the command data sent to the arbitrary memory arrangement address are received by the buffer chip. This ensures that the respective buffer chip also receives the command data securely, and the command data sent to the arbitrary memory arrangement address can be received by the receiving buffer chip.

Preferably, in normal mode the buffer chip can receive data and forward them in parallel to the one or more connected memory arrangements. The buffer chip can receive the data from the one or more connected memory arrangements and can transmit them serially. This allows a high data transfer rate from and to the buffer chip to be converted into a lower data rate for data transfer between the buffer chip and the memory circuit.

A further aspect of the present invention provides a method for allocating memory arrangement addresses to a first and a second buffer chip. The first and the second buffer chip allocate memory arrangement addresses to one or more respective connected memory arrangements using the above-described method. The buffer chips are connected in series such that the first buffer chip transmits the second initialization data in the form of first initialization data to the second buffer chip. This allows the buffer chips to be arranged in cascaded form, so that they successively assign and allocate memory arrangement addresses, with allocation of the memory arrangement addresses involving attention being paid to previously assigned memory arrangement addresses not being allocated to memory arrangements again. This allows the buffer chips to be initialized essentially without the involvement of a memory access control unit, which means that the initialization takes place essentially automatically in the buffer chip.

To start the initialization, provision is preferably made for the first buffer chip to receive the first initialization data from a memory access control unit (memory controller). For the initialization, the memory access control unit thus sends the buffer chip first initialization data specifying that all memory arrangement addresses are available. The first buffer chip allocates addresses to the memory arrangements connected to it and adds to the initialization data the information that the associated memory arrangement addresses have been assigned. The second buffer chip is then sent initialization data specifying that the memory arrangement addresses which have already been assigned are in use and the remaining memory arrangement addresses are available. The second buffer chip can then use the same procedure to assign memory arrangement addresses for the memory arrangements which are connected to it, said memory arrangement addresses having been chosen from the memory arrangement addresses which are still available.

Preferably, provision can be made for the second buffer chip to transmit the second initialization data to the memory access control unit. When the second buffer chip has assigned the memory arrangement addresses for the memory arrangements connected to it, the second buffer chip generates second initialization data specifying which memory arrangement addresses are still available after assignment by the first and the second buffer chip. These second initialization data are transmitted back to the memory access control unit, so that the latter can establish how many memory arrangements are being served by the buffer chips. If provision has been made for every bit of the memory arrangement address to address a memory arrangement, the memory access control unit can thus also be notified about which addresses can be used to address memory arrangements and which addresses cannot be used to address a memory arrangement.

A further aspect of the present invention provides a buffer circuit, preferably in a buffer chip, for one or more connected memory arrangements. The buffer chip has a reception unit for receiving first initializing data which specify available memory arrangement addresses. The buffer chip also has a transmission unit for transmitting second initialization data. An initialization unit having an address association unit associates memory arrangement addresses with the one or more memory arrangements connected to the buffer chip. In this case, the associated memory arrangement addresses are chosen from the available memory arrangement addresses. The initialization unit then generates second initialization data which specify the memory arrangement addresses which are still available after the association by the address association unit.

In this way, a buffer chip is obtained which independently allocates memory arrangement addresses from a selection of available memory arrangement addresses to the memory arrangement which is connected to it, and generates second initialization data which are either made available to a subsequent buffer chip having connected memory arrangements or are transmitted to the memory access control unit. The subsequent buffer chip can use the second initialization data, which specify the memory arrangement addresses which are still available, likewise to assign memory arrangement addresses to the memory arrangements connected to it and likewise to generate second initialization data, which are transmitted to the subsequent buffer chip or to the memory access control unit as appropriate.

The advantage of the inventive buffer chip is that the buffer chip independently allocates memory arrangement addresses without the memory arrangements requiring previously used addresses and without the memory access control unit needing to perform any allocation.

The buffer chip preferably has a conversion unit which has a parallelization unit for parallelizing received data and a serialization unit for serializing data which are to be transmitted. This allows the number of data lines from and to the buffer chip and the memory arrangements connected thereto to be reduced. This has the advantage that the data lines can be provided in essentially much simpler form, in the same length, so that higher transfer rates are possible, since the transfer frequency is not restricted on the basis of propagation time.

The initialization unit is capable of assuming an initialization mode, which is assumed after the control chip has been turned on and/or after a reset.

Alternatively, the initialization unit can also assume the initialization mode after command data have been received. To this end, the memory access control unit generates command data which specify that the memory arrangement addresses now need to be associated in an initialization mode.

A further aspect of the present invention provides a memory module having a buffer chip in line with the invention and one or more memory arrangements which are associated with the buffer chip. Preferably, such a memory module is in the form of a DIMM module, as provided in conventional personal computers, and the memory arrangements have DRAM chips. The inventive buffer chip allows the memory modules to be provided in the same design and to be used in corresponding positions, for example without prior configuration of the personal computer's motherboard or of the memory modules, with independent initialization and association of memory arrangement addresses taking place in the memory modules.

BRIEF DESCRIPTION OF THE DRAWINGS

One particular embodiment of the invention is explained in more detail below with reference to the appended drawings, in which:

FIG. 2 shows a table showing the command protocol for actuating the buffer chips.

DETAILED DESCRIPTION OF THE PREFERRED EMBODIMENT

Figure 1:
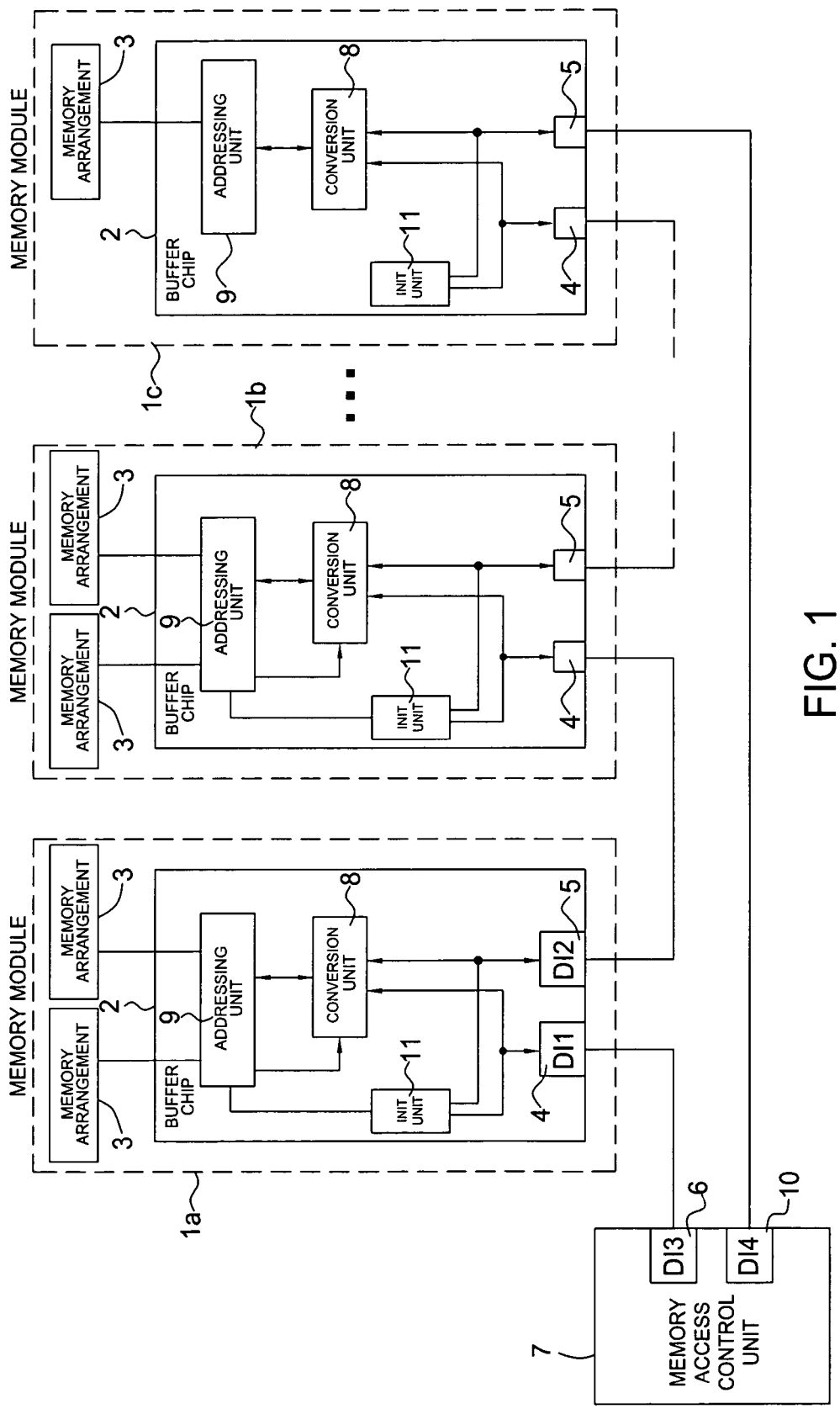
FIG. 1 shows an illustration of a memory system with buffer chips in line with one embodiment of the invention.

FIG. 1 shows a memory system having memory modules 1a, 1b, 1c. The memory modules 1a, 1b, 1c each have a buffer chip 2 on which two respective memory arrangements 3 are arranged. A different number of memory arrangements may also be connected to the buffer chips 2.

The memory modules 1a, 1b, 1c preferably take the shape of a DIMM module. Other forms of the memory module 1 may also be provided, however. The memory arrangements are preferably formed using DRAM memory components. Other memory components, such as SRAM or the like, may also be used.

In normal mode, the buffer chips 2 are used for receiving and transmitting data from and to respectively addressed memory arrangements. The buffer chips 2 are provided in order to reduce the number of data lines to the memory modules 1. As the number of data lines increases, it becomes difficult to provide the data lines in the same length. Since, as the data transmission frequency increases, differences in the lengths of the data lines are a significant factor for limiting the maximum data transmission frequency, it is necessary to limit the number of data lines and to provide them in the same length in order to increase the data rate from and to the memory modules 1.

It is also necessary to reduce the total length of the data lines and also their connected inputs in order to reduce the overall capacity of the data lines and hence to require a lower driver power in order to transmit data. For this reason, the buffer chips 2 are not connected to a common bus, but rather every buffer chip 2 has a first bidirectional data interface 4 and a second bidirectional data interface 5.

The first bidirectional data interface 4 can be used to receive data which, depending on whether or not the corresponding memory module 1a, 1b, 1c is being addressed, are forwarded via the second data interface 5. If the corresponding memory module 1 is being addressed, then the data are used for addressing or writing to the addressed memory arrangement. If it is not being addressed, then the data are forwarded via the second data interface 5. The memory modules 1a, 1b, 1c are coupled to one another in the form of a daisy chain, so that the respective second data interface 5 is connected to a respective first data interface 4 on the subsequent buffer chip 2 in the subsequent memory module 1b, 1c.

The first data interface 4 on the buffer chip 2 in the first memory module 1a in the series-connected chain of memory modules 1 is connected to a third data interface 6 on a memory access control unit (memory controller) 7.

Each buffer chip 2 has a conversion unit 8 for parallelizing data (received via one of the data interfaces 4, 5) which are intended to be written to one of the memory arrangements 3 and for serializing from one of the memory arrangements 3 via one of the data interfaces 4, 5, so that the data to be transmitted are transferred to a smaller number of data lines than has been made available by the respective memory arrangement 3. In the example shown, the length of the data sent via the data interfaces 4, 5 is 8 bits. Following parallelization, the data length comprises 32 bits for accessing the memory arrangements.

By virtue of the memory access control unit 7 and each of the memory modules 1a, 1b, 1c being connected to one another such that in each case only point-to-point (P2P) connections exist, the transfer rate on such connecting lines can be increased significantly as compared with the transfer rates on a common bus, since the load capacities of the connecting lines are significantly reduced.

The conversion unit 8 is connected to an addressing unit 9 which takes the addressed address as a basis for selecting one of the two connected memory arrangements 3 for the purpose of writing received data to the corresponding memory arrangement 3 and reading data which are to be transmitted from the corresponding memory arrangement 3. If the addressing unit 9 recognizes that none of the memory arrangements 3 connected to this buffer chip 2 has been addressed, then the data are forwarded from the first data interface 4 via the conversion unit 8 and the second data interface 5, so that the data are forwarded unchanged to the subsequent memory module 1 via the latter's first data interface. It is naturally also conceivable for the data interfaces to be connected to the addressing unit 9 at first, and for the received data to be forwarded to the conversion unit 8 only when one of the memory arrangements 3 associated with the buffer chip has been addressed.

In this way, the first memory module 1a in the chain is first of all asked whether the addressed memory arrangement 3 is located on the first buffer chip 2. If not, the corresponding command which has been generated by the memory access control unit 7 is forwarded via the second data interface 5 to the subsequent first data interface 4 on the second memory module 1b. There, a check is likewise performed to determine whether the command relates to one of the memory arrangements 3 which are connected to the respective buffer chip 2. The command is thus forwarded from memory module 1a, 1b, 1c to the respective subsequent memory module 1a, 1b, 1c, until the addressed memory arrangement 3 has been addressed via the respective buffer chip 2. The second data interface 5 on the buffer chip 2 in the last memory module 1c is connected to the memory access control unit 5 via a fourth data interface 10. Thus, if the transmitted command relates to none of the memory arrangements 3, then the transmitted command is received via the fourth data interface 10 again, and the memory access control unit 7 knows that the transmitted memory arrangement address cannot be used to address a memory arrangement 3.

The table shown in FIG. 2 illustrates one possible command protocol. By way of example, the command is transmitted in four successive parts, i.e. upon rising and/or falling edges of a clock signal, from the memory access control unit 7 to the first memory module 1a. The data lines between the data interfaces 4, 5, 6, 10 comprise the length of 8 bits CA[0–7] for the exemplary embodiment shown and for the corresponding command protocol. In the first part, the memory arrangement address R[0–7] for the respective memory arrangement 3 is transferred. In the next part, a second part of the command is transferred. The first bit of the second part of the command comprises a signal which notifies the buffer chip 2 that a command for the buffer chip is involved (e.g. bit CA[0] has been set) in which, by way of example, setting values for the buffer chip are transferred, or that one of the connected memory arrangements 3 is to be addressed.

The second bit of the second part of the command specifies whether the word line needs to be activated (RAS signal), and the third bit of the second part of the command specifies whether the bit line needs to be activated for reading or writing data to the memory cell in question (CAS signal). The fourth bit of the second part of the command specifies whether anything is to be written or read to a memory cell in the memory arrangement 3 in question (WE signal). The next four bits of the second part of the command specify which of the memory banks B[0–3] of the respective memory arrangement 3 need to be read. This allows four memory banks to address one conventional memory arrangement 3. It is also possible for a different number of memory banks to be provided in the respective memory arrangements 3, however.

The third and fourth parts of the corresponding command comprise the address to which data are to be written in the addressed memory arrangement 3 or from which data in the corresponding memory arrangement are to be read. In the example shown, the address comprises 16 bits. The size of the address may also comprise a different number of bits, however. The number of parts of the command is also not limited to four.

Following such a command, data can now be written to the addressed memory arrangement 3 at the respectively addressed address, or data can be read from the addressed memory arrangement 3 from the respectively specified address in the command.

In the first part of the command, the memory arrangement address is transferred. However, so that the corresponding buffer chip knows that one of the memory arrangements 3 connected to it has been addressed using the address, the start of the normal mode in memory modules 1a, 1b, 1c must first be preceded by allocation of the memory arrangement addresses to the memory arrangements 3. That is to say, therefore, that before the memory arrangements 3 can be addressed in normal mode the memory arrangement addresses first need to be allocated to the memory arrangements 3 in the buffer chips 2 in an initialization mode. To this end, every buffer chip 2 contains an initialization unit 11 which is in an activated state during the initialization mode.

The initialization mode can be assumed, by way of example, as soon as a supply voltage for the memory module 1 is turned on, e.g. after the personal computer in which the memory module 1 in question is fitted has been turned on or after a reset signal, e.g. after the entire computer system has been reset globally.

The initialization unit 11 is connected to the first and second data interfaces 4, 5 and to the addressing unit 9. The addressing unit 9 informs the initialization unit 11 of how many memory arrangements 3 are connected to the addressing unit 9. This can be done by simply polling the addressing unit 9.

At the start of the initialization phase, the memory access control unit 7 transmits, as a first initialization data item, an essentially single-component address signal, i.e. just one address signal in one clock period. In this case, a set bit in the address signal corresponds to an already assigned memory arrangement address, with each bit CA[0–7] of the memory arrangement address corresponding to a memory arrangement. That is to say that, if the first bit CA[0] has been set, the memory arrangement 3 is addressed using the corresponding address "0x0000 0001" (binary notation). If the second bit CA[1] has been set (0x0000 0010), then a further second memory arrangement 3 is addressed.

Since a memory arrangement address has normally not yet been assigned at the start of the initialization mode, the memory association control unit 7 generates an address signal 0x0000 0000. This is transmitted via the first data interface 4 to the buffer chip 2 in the first memory module 1. The initialization unit 11 receives the first initialization data and gathers therefrom that all eight possible addresses are still available for the memory arrangements 3.

Via the address association unit 9, the initialization unit 11 receives the information regarding how many memory arrangements 3 are associated with the buffer chip 2 in question. According to the number of connected memory arrangements 3, the initialization unit 11 selects a corresponding number of available memory arrangement addresses and marks them, e.g. with a logic "1". In the case of the two connected memory arrangements 3, this results, by way of example, in the first two bits CA[0], CA[1] being used and being transmitted as second initialization data via the second data interface 5.

The second initialization data are received by the subsequent buffer chip 2 via the first data interface 4 as first initialization data, and the initialization unit 11 in the buffer chip 2 in the second memory module 1b recognizes from the received first initialization data that the first two memory arrangement addresses have been assigned. In the same way, the initialization unit 11 asks the address association unit 9 how many memory arrangements 3 are connected to the buffer chip 2 in question. The connected memory arrangements 3 are now again allocated a respective memory arrangement address in the initialization unit 11, with the memory arrangement addresses being selected from the available memory arrangement addresses, i.e. from the addresses CA[3–7] which have not been assigned.

If the addresses are assigned consecutively, then a binary "0x0000 1111" data item is generated in the initialization unit 11 as second initialization data item and is forwarded to the subsequent memory module. The exemplary second initialization data item specifies that the first four memory arrangement addresses have already been assigned.

The second initialization data item is forwarded to the subsequent buffer chip 2, where it is received as first initialization data item in the manner described above. This is done until the last memory module 1c has been reached. There, the same procedure is used to provide the connected memory arrangement 3 with a memory arrangement address which is still available. The second initialization data generated therefrom are then sent to the memory association control unit 7, preferably via the fourth data interface 10. The memory association control unit 7 then knows how many memory arrangements there are and which addresses can be used to address them.

As a further way of initiating an initialization mode, provision can be made for the command protocol to a command intended for the buffer chip 2 (first bit of the second part of the command is set) is transmitted by the memory association control unit 7. A particular coding for the parts of the command then allows the initialization to be started in the initialization unit 11. So that the command unit 11 reacts to the initialization signal from the memory association control unit 7, a particular initial address can be associated with all the memory arrangements 3 in the memory modules after the memory modules 1 have been reset or turned on.

The initialization address is transmitted by the memory association address with the first part of the command, and the initialization start command is then transferred with the second part of the command. The memory arrangement addresses are then assigned using the method described previously. As second initialization data, however, unlike in the case of the methods described previously, an entire command comprising four parts is respectively forwarded to the respective subsequent memory module 1.

Figure 3:
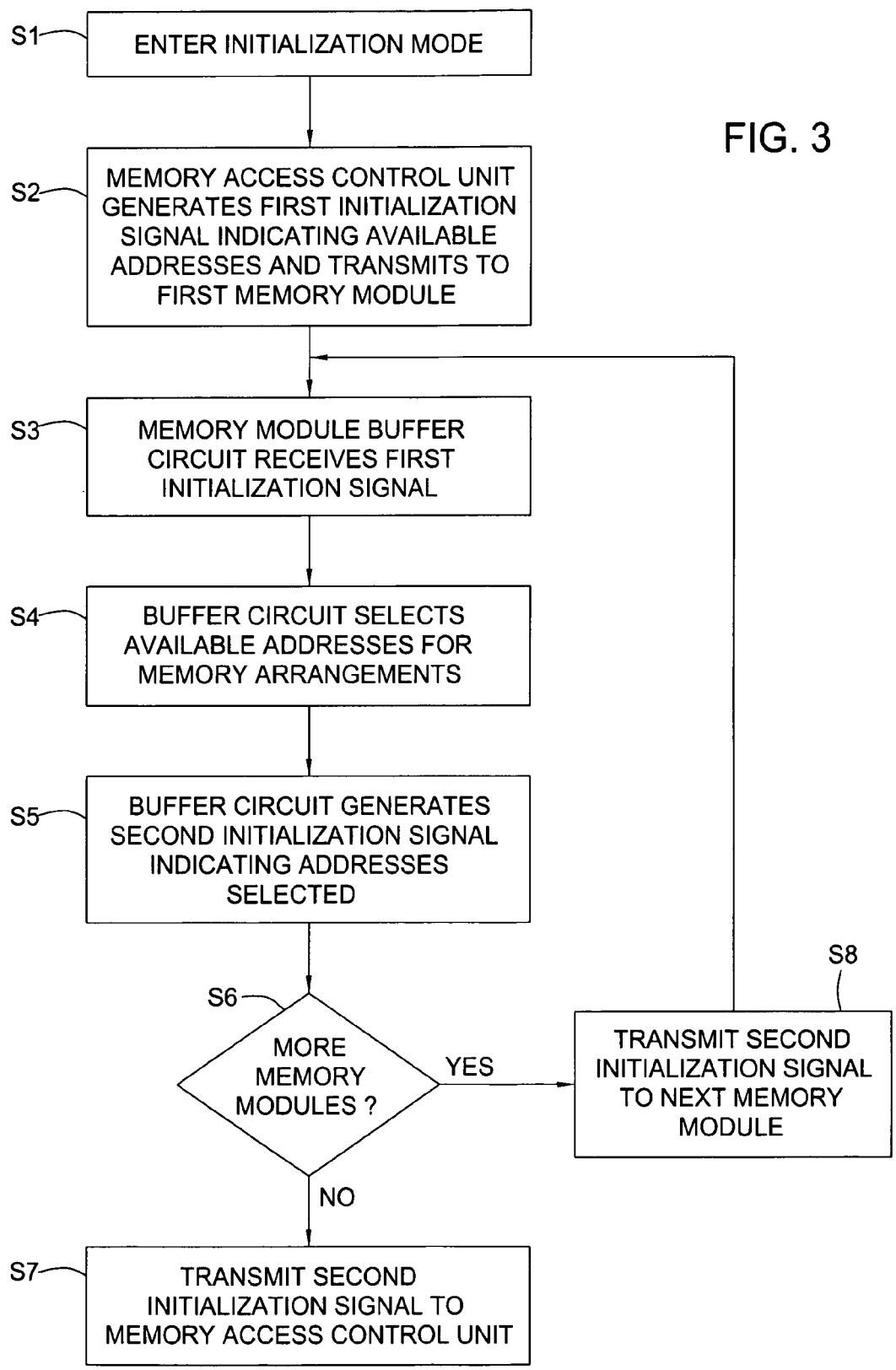
FIG. 3 shows a flowchart to illustrate the inventive method.

FIG. 3 shows a flowchart to illustrate the inventive method in line with one embodiment. In a step S1, an initialization mode is entered, for example, in response to a reset signal or turning-on of the memory modules 1. At the start of the initialization phase, a memory association control unit 7 then generates, in a step S2, a first initialization signal specifying which of the memory arrangement addresses are still freely available. The first initialization data are then received by the first memory module 1 connected to the memory association control unit 7 (step S3).

According to the number of memory arrangements 3 connected to the respective buffer chip 2, memory arrangement addresses are generated which are selected from the available memory arrangement addresses (step S4). In a step S5, second initialization data are generated, with the second initialization data containing the information about the memory arrangement address which has already been assigned on the basis of the first initialization data and about the memory arrangement addresses currently assigned for the current memory module 1a, 1b, 1c.

The second initialization data thus contain information about the memory arrangement addresses which are still available, with the memory arrangement addresses which are not available on the basis of the first initialization data and those which are currently assigned being identified as unavailable (step S5). In a polling step S6, it is established whether a further memory module 1a, 1b, 1c is connected to the memory module which has just been considered. If so, the second initialization data are transmitted to the subsequent memory module 1a, 1b, 1c as first initialization data (step S8), and steps S3 to S5 of the method are repeated. If no other memory module 1a, 1b, 1c is connected to the current memory module 1a, 1b, 1c, then the second initialization data are transmitted to the memory association control unit 7 in a step S7.

The initialization mode in each of the memory modules 1a, 1b, 1c has ended as soon as the memory arrangement addresses have been allocated and a corresponding initialization data item has been generated.

What is claimed is:

1. A method for allocating memory arrangement addresses to a buffer chip, during an initialization mode, for use in addressing one or more memory arrangements connected to the buffer chip, comprising:
   receiving first initialization data specifying a first set of available memory arrangement addresses;
   associating one or more of the first set of available memory arrangement addresses with the one or more memory arrangements connected to the buffer chip;
   generating, by the buffer chip, second initialization data specifying a second set of available memory arrangement addresses comprising the first set of available memory arrangement addresses less the memory arrangement addresses associated with the one or more memory arrangements connected with the buffer chip; and
   transmitting the second initialization data from the buffer chip.

2. The method of claim 1, wherein the first initialization data comprise a number of bits, with each bit corresponding to an address for a memory arrangement.

3. The method of claim 1, wherein:
   the initialization mode is entered after at least one of: reset or power-up of the buffer chip; and
   the initialization mode is terminated after the memory arrangement addresses have been allocated.

4. The method of claim 3, wherein reset or power-up of the buffer chip is followed by an arbitrary memory arrangement address being allocated, so that the command data sent to the arbitrary memory arrangement address is received by the buffer chip.

5. The method of claim 1, wherein the initialization mode is entered in response to command data being received.

6. The method of claim 1, wherein, in a normal mode, the buffer chip receives data and forwards them in parallel to the one or more memory arrangements, receives the data from the one or more memory arrangements and transmits them serially, or both.

7. The method of claim 1, wherein transmitting the second initialization data from the buffer chip comprises transmitting the second initialization data to another buffer chip for use in allocating memory arrangement addresses to memory arrangements connected thereto.

8. The method of claim 7, wherein the buffer chips are connected in series such that a first buffer chip transmits the second initialization data in the form of first initialization data to a second buffer chip.

9. The method of claim 8, wherein the first buffer chip receives the first initialization data from a memory access control unit.

10. The method of claim 8, wherein the second buffer chip transmits the second initialization data to a memory access control unit.

11. A buffer chip for use with one or more memory arrangements, comprising:
    a reception unit for receiving first initialization data which specify available memory arrangement addresses;
    an initialization unit for, during an initialization mode, associating memory arrangement addresses with the one or more memory arrangements associated with the buffer chip, the associated memory arrangement addresses being chosen from the available memory arrangement addresses, wherein the initialization unit generates second initialization data specifying the memory arrangement addresses which are still available after the association, wherein the memory arrangement addresses which are still available after the association are those addresses specified in the first initialization data less the addresses associated with the one or more memory arrangements; and
    a transmission unit for transmitting the second initialization data to another buffer chip.

12. The buffer chip of claim 11, further comprising a conversion unit which has a parallelization unit for parallelizing received data and has a serialization unit for serializing data which are to be transmitted.

13. The buffer chip of claim 11, wherein the initialization unit enters the initialization mode after the buffer chip in response to at least one of: reset or power-up of the buffer chip.

14. The buffer chip of claim 11, wherein the initialization unit enters the initialization mode after command data have been received.

15. A memory module, comprising:
    one or more memory arrangements; and
    a buffer chip coupled with one or more memory arrangements, wherein the buffer chip comprises:
    a reception unit for receiving first initialization data which specify available memory arrangement addresses;
    an initialization unit for, during an initialization mode, associating one or more of the available memory arrangement addresses with the one or more memory arrangements and generating second initialization data specifying the memory arrangement addresses which are still available after the association, wherein the memory arrangement addresses which are still available after the association are those addresses specified in the first initialization data less the one or more addresses associated with the one or more memory arrangements; and a transmission unit for transmitting the second initialization data.

16. The memory module of claim 15, wherein the memory module is in the form of a DIMM module.

17. A memory system, comprising:
a memory access control unit; and
one or more memory modules, each comprising one or more memory arrangements and a buffer chip coupled with one or more memory arrangements, wherein the buffer chip comprises:
a reception unit for receiving first initialization data which specify available memory arrangement addresses;
an initialization unit for, during an initialization mode, associating one or more of the available memory arrangement addresses with the one or more memory arrangements and generating second initialization data specifying the memory arrangement addresses which are still available after the association, wherein the memory arrangement addresses which are still available after the association are those addresses specified in the first initialization data less the one or more addresses associated with the one or more memory arrangements; and
a transmission unit for transmitting the second initialization data.

18. The memory system of claim 17, wherein a buffer chip of a first one of the memory modules receives first initialization data from the memory access control unit.

19. The memory system of claim 18, wherein a buffer chip of a last one of the memory modules transmits second initialization data to the memory access control unit.

20. The memory system of claim 17, wherein the buffer chips enter the initialization mode in response to at least one of: reset of the memory modules, power-up of the memory modules, and command data.

* * * * *